May 17, 1955    J. E. SHEPHERD    2,708,751
ERROR INDICATING SYSTEM
Original Filed April 30, 1942    4 Sheets-Sheet 1

INVENTOR.
JAMES E. SHEPHERD
BY Paul B. Hunter
ATTORNEY

May 17, 1955  J. E. SHEPHERD  2,708,751
ERROR INDICATING SYSTEM
Original Filed April 30, 1942  4 Sheets-Sheet 2

INVENTOR.
JAMES E. SHEPHERD
BY Paul B. Hunter
ATTORNEY

May 17, 1955   J. E. SHEPHERD   2,708,751
ERROR INDICATING SYSTEM
Original Filed April 30, 1942   4 Sheets-Sheet 3

INVENTOR.
JAMES E. SHEPHERD
BY
*Paul B. Hunter*
ATTORNEY

May 17, 1955  J. E. SHEPHERD  2,708,751
ERROR INDICATING SYSTEM
Original Filed April 30, 1942  4 Sheets-Sheet 4

INVENTOR.
JAMES E. SHEPHERD
BY
Paul B. Hunter
ATTORNEY

United States Patent Office 2,708,751
Patented May 17, 1955

2,708,751

ERROR INDICATING SYSTEM

James E. Shepherd, Hempstead, N. Y., assignor to The Sperry Corporation, a corporation of Delaware Original application April 30, 1942, Serial No. 441,188. Divided and this application March 31, 1948, Serial No. 18,159

16 Claims. (Cl. 343—16)

The present invention is concerned with radio-directed fire control systems especially adapted for use in aircraft and against other fast moving aircraft.

The present application is a divisional of copending application Serial No. 441,188, filed in the United States Patent Office on April 30, 1942, now Patent No. 2,617,982.

For the protection of large aircraft, such as heavy bombers, it is known to use flexible gun turrets movable independently of the craft in association with a computing gun sight or computer which is manually tracked with the target and thereby derives the proper gun aiming data for controlling the gun turrets. Up to the present time, however, such inter-aircraft fire control devices, and also anti-aircraft fire control devices, have relied upon visual tracking of the target for determining the correct gun aiming angles. Such prior art systems are subject to the well known limitations of visual sighting, such as reliance upon proper weather and visibility conditions, upon sufficient lighting, and upon the restricted range of optical telescopes. Even under optimum conditions of visibility, the visual detection of the approach of aircraft and visual tracking with aircraft have been difficult and uncertain. For instance, aircraft approaching from the direction of the sun can be seen only with the greatest difficulty. Furthermore, the observer cannot scan the whole zone of danger quickly and carefully with certainty by the eye alone.

In order to overcome these and other disadvantages of the prior systems, the invention of parent application Serial No. 441,188 now patent 2,617,982, provides a system in which the target is detected, located, and tracked by a radio beam which effectively replaces the visual line of sight of prior systems. However, before describing the present system, certain essential requirements for such a system will be discussed.

Firstly, the defending aircraft must be appraised of the presence and approximate direction or orientation of all targets in its vicinity in order to be able to effectively plan and accomplish its defense. In addition, it is desirable that the approximate range of each of these various targets should be indicated simultaneously with its location, for similar reasons. After having been warned of the presence, orientation, and range of these targets, and after having chosen one or more of them as of greater importance for immediate engagement, it is necessary for the particular target selected to be tracked by the fire control system in order to determine the target present position, such as defined by its elevation, azimuth, and range, in the present case, and to determine the rate of change of position, as defined by target elevation rate and azimuth rate, in order that the correct gun aiming angles for controlling the guns and turrets may be derived by the computer.

In order to relieve the fire control officer of as much of the burden of tracking as is reasonably possible, it is desirable to automatically track with the target, at least in elevation and azimuth, and possibly also in range, so as to automatically set into the computer mechanism the proper target position and target rate data.

The system of said parent application Serial No. 441,188 now Patent 2,617,982 offers an improved type of warning or searching system for use in combination with several types of tracking or fire control systems. Preferably, since space and weight are at a premium in aircraft, these various systems are combined as much as possible to use a minimum amount of equipment.

Accordingly, there is provided apparatus for indicating the presence, approximate orientation, and aproximate range of any selected or all targets within a predetermined portion of space, such as a hemisphere, which apparatus may be converted upon selection of a particular target, as shown in parent application Serial No. 441,188 now Patent 2,617,982, into any one of three different types of tracking systems: (1) a system in which the fire control officer actuates the computer setting in such a manner as to maintain a radio line of sight in track with a target, (2) a system in which a radio line of sight is automatically tracked with a target and the fire control officer actuates a computer to maintain it in synchronism with the radio line of sight, and (3) a fully automatic system in which a radio line of sight is automatically maintained in synchronism with the target and serves to automatically set into the computer the proper target data required by the computer.

By such a system both the warning and tracking may be performed entirely independently of any optical visibility conditions and at a much greater range than was formerly possible, without impairing in any way any of the desirable features of former types of fire control systems.

In addition, the operation of the system is made to agree in substantially all operations to be performed with the operation of prior systems and the natural instinctive reactions of the operator are utilized by the provision of controlling operations which are naturally dictated by the circumstances encountered.

Accordingly, it is an object of the present invention to provide improved gun control systems independent of the visual devices.

It is another object of the present invention to provide improved devices for indicating the relative displacement between the orientation of a distant object and a predetermined axis such as a radio line of sight.

More specifically, it is an object of the present invention to provide an error indication on a cathode ray tube by intensity modulation.

Another object resides in the provision of means whereby an error and the direction of such error is provided by intensity modulation of the beam of a cathode ray tube describing a predetermined geometric figure.

Another object resides in the provision of an error indicating system employing a cathode ray tube in which a circle is described by the beam of the cathode ray tube and the beam is intensity modulated whereby to provide a crescent-like indication of the direction of such error.

Still another object resides in providing an error indicating system in which the magnitude and direction of an error are represented on the screen of a cathode ray tube by shifting the geometric figure produced on the screen of said tube from the electrical center of said tube in a direction corresponding to the direction of the error and to an extent representative of the magnitude of said error and simultaneously modulating the intensity of the beam in each cycle thereof forming the figure additionally to represent said error by the relative positions of the more and less intense portions of the figure.

Other objects and advantages of the present invention will become apparent from the following specification and drawings, in which:

Although we have herein described our invention in connection with a gun control system and particularly in connection with a more comprehensive system, more fully described in parent application Serial No. 441,188 now Patent 2,617,982, it is to be understood that our present invention is not necessarily limited to such use but may be employed in other indicating systems involving different parameters.

As discussed above, the system, with which the present invention is adapted for use, is adapted for two major types of operation, namely, (1) a searching operation for roughly indicating the position and/or distance of any targets within the field of operations of the device and (2) a tracking operation in which a particular target may be selected and followed by the device for properly directing a gun thereat. Three alternative types of tracking operation, known as "manual," "semi-automatic," and "full automatic" tracking may be used.

For describing generally these various types of operation, recourse is had to Figs. 1–4, more specific details of the system being described with respect to later figures.

Figure 1:
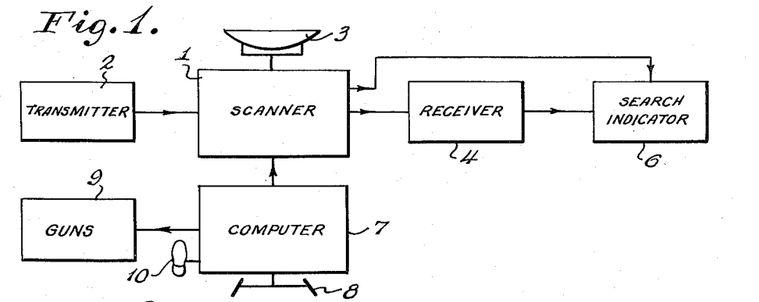
Fig. 1 shows a block or flow diagram of the system of the invention during searching operations.

Fig. 1 shows a block or flow diagram of the present system when operating during searching. In this system, a scanner 1 projects a sharply directive beam of radiant energy, such as 19 in Fig. 6, obtained as from a suitable transmitter 2 and directive antenna arrangement 3. This beam comprises a periodic sequence of short duration pulses of high frequency energy, and during searching is swept in a spiral cone over a predetermined solid angle, which is preferably substantially a hemisphere, in such manner that the radiant energy is projected at some time during its cycle into every part of the solid angle. Should any object or target be located in this solid angle, the projected radiant energy will be reflected therefrom when the beam is directed thereat, and will be received in the same antenna system 3, which acts dually as a transmitting and a receiving system.

This reflected series of pulses of high frequency energy is received in a radio receiver 4 whose output actuates a suitable indicator 6. This indicator, as will be described below more in detail, is preferably a cathode ray tube whose electron beam trace is caused to sweep in spirals in synchronism with and instantaneous correspondence with the spiral scanning motion of the scanner. For this purpose the indicator 6 is also controlled from scanner 1. The received reflected pulse is caused to momentarily brighten the trace of the beam and thereby produce on the cathode ray screen an indication of the existence and approximate orientation of the reflecting object. The approximate range of the reflecting object may also be shown.

The orientation of the scanner 1, which may be taken to be the orientation of the polar axis of the spiral conical scanning motion, is placed under the control of a computer 7, whose elevation and azimuth settings may be manually actuated from a suitable manual control 8. Computer 7 is adapted to calculate the proper gun aiming angles for intercepting the target by a projectile when the computer is set in accordance with the present target position data, such as elevation, azimuth and range of the target, and in accordance with the rate of change of the present target position, such as elevation rate and azimuth rate. A suitable form for such a computer is shown more in detail in copending application Serial No. 411,186 now abandoned, for Inter-Aircraft Gun Sight and Computer, filed September 17, 1941, in the names of C. G. Holschuh and D. Fram. As is shown in this copending application, the range setting of computer 7 may be performed by a suitable foot pedal 10. The orientation control is effected by a handle bar control 8 whose displacement about two independent axes represents a combination of the displacement and rate of change of displacement of azimuth and elevation settings of computer 7, providing aided tracking. In operation, the controlling officer actuates control 8 so as to maintain the present target position setting of the computer 7 in track with the target, as evidenced (in the prior application) by a suitable optical sighting arrangement. By so doing, the proper target elevation, target azimuth, target elevation rate and target azimuth rate are set into the computing mechanism 7 together with the range data set in by foot pedal 10, whereby computer 7 may determine the gun aiming angles. In the present system, the same operations are performed, but utilizing a different type of indicator to show the proper tracking conditions, as will be described.

The scanner 1 is suitably controlled, as will be seen hereinafter (in accordance with the target elevation and target azimuth setting of computer 7. The gun aiming angles determined by computer 7 are used to suitably control the orientation of one or more guns or turrets 9, which are thereby rendered effective against the target.

A suitable type of gun control apparatus for orienting the guns 9 under the control of the computer 7 is shown in copending application Serial No. 424,612, for Hydraulic Remote Operating Systems, filed December 27, 1941, in the names of E. L. Dawson, F. M. Watkins and C. N. Schuh, Jr., now Patent No. 2,445,765. It is to be noted that the present system is not confined to the use of this particular type of gun control apparatus, but that any other suitable type of remote control system may also be used. If desired, the guns 9 need not be directly controlled from computer 7 but may be locally controlled in accordance with suitable indications transmitted from computer 7 in any well known manner.

The system as shown in Fig. 1 is not intended for use as the actual gun control system but is merely intended to search out possible targets and to enable the scanner to properly locate a target for the purpose of later tracking with it. For this reason, the control from computer 7 to guns 9 is shown dotted in Fig. 1. After a target is observed on the screen of cathode ray indicator 6, the manual control 8 of computer 7 is actuated to adjust the orientation of scanner 1 to the position where this orientation coincides as closely as possible with the orientation of the desired target, as evidenced by the position of the bright spot indication on the indicator screen. When this adjustment has been made, the system is ready to change-over to the tracking operation.

The system is adapted to use three separate and distinct types of tracking, any one of which may be selected at the option of the fire control officer. It is to be noted that each of these types of tracking system may be used independently of the others if desirable. For all of these types of tracking operation, scanner 1 is energized from transmitter 2 by the same type of periodic pulse wave as described with respect to the searching operation. However, scanner 1 no longer performs spiral scanning as in Fig. 1 but instead it is converted to perform a narrow circular conical scanning with a very small apex angle. Preferably, this angle is of the order of the angular width of the radiation and reception pattern derived from antenna 3, included in Figs. 6, 7 and 7A.

Figures 5, 6, 7, 7A, 8, 8A:
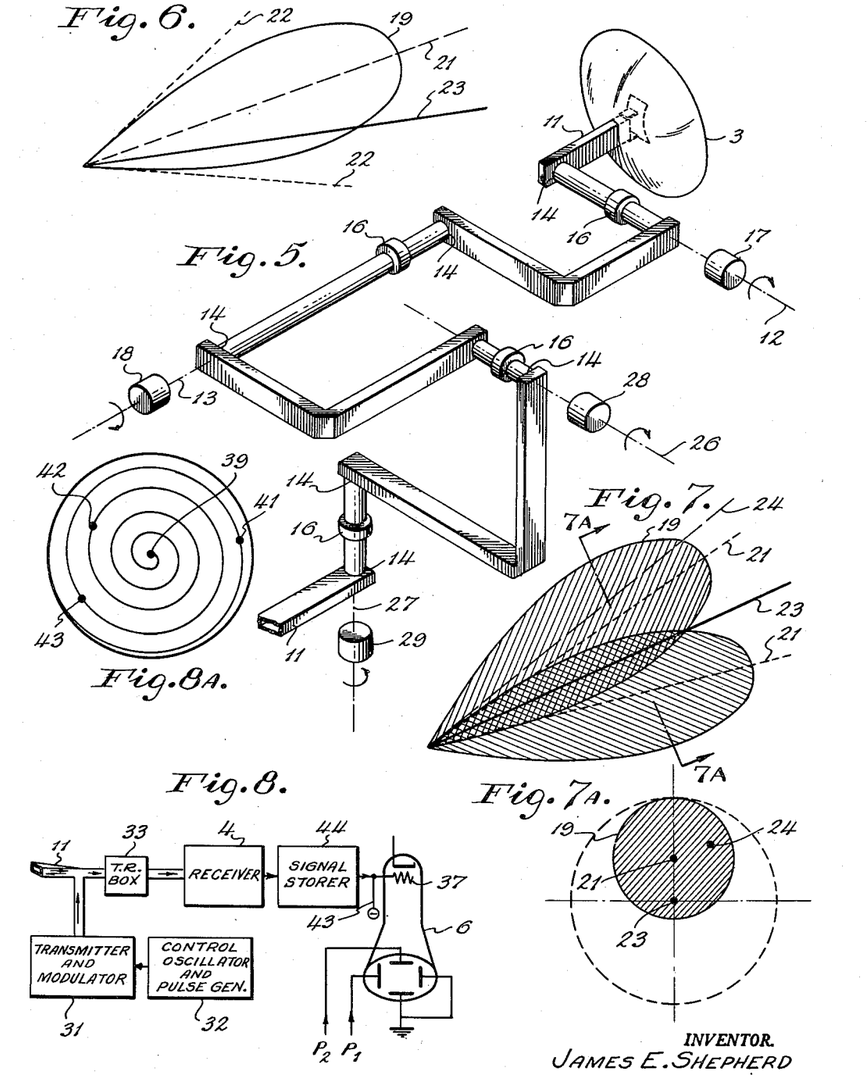
Fig. 5 shows a schematic perspective view of one form of scanner useful in the present system.
Fig. 6 shows the radiation pattern of the directive antenna array used with the scanner of Fig. 5.
Fig. 7 shows a longitudinal cross-sectional view of the radiation pattern of the scanner of Fig. 5 during any of the tracking operations.
Fig. 7A is a cross-section of Fig. 7 taken along lines 7A—7A thereof.
Fig. 8 shows a schematic block wiring diagram of one form of radio transmitting, receiving and indicator circuit for searching operations.
Fig. 8A shows a representative view of the cathode ray screen of the indicator of Fig. 8.

Thus, if antenna system 3 is adapted to produce a beam of radiant energy having a directive radiation pattern such as 19 in Fig. 6 with a directivity axis 21 then, during tracking, beam 19 will be rotated by scanner 1 about an axis such as 23 in Fig. 7, whereby directivity axis 21 performs a conical motion about axis 23, which may be termed the tracking directivity axis since it is this axis which defines the radio line of sight, as will be seen. Preferably, radiation pattern 19 is made to have a small apex angle such as of the order of 4° in angular width between the half-power points. Then, during tracking, the cone described by axis 21 would preferably have an apex angle also of the order of 4°. In this manner, the useful portion of the radiant energy would be projected over a conical solid angle having an 8° apex angle. Energy reflected from an object or target within the field of this radiant energy will be received by antenna arrangement 3 and led thereby to receiver 4 whose ouput actuates the tracking indicator 6′ to indicate the relative displacement between the scanner orientation defined by axis 23 and the orientation of the target.

Figure 2:
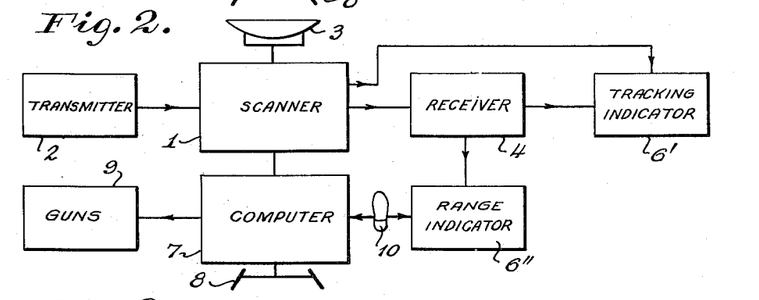
Fig. 2 shows a corresponding block diagram of the system during manual tracking operations.

In the system of Fig. 2, manual actuation of computer control 8 serves to set azimuth and elevation data into computer 7 and at the same time controls the orientation of scanner 1, as determined by axis 23, to assume the same azimuth and elevation as is set into computer 7, in the same manner as described with respect to Fig. 1. In effect the orientation of scanner 1 is made the same as the orientation of computer 7, the latter term meaning the orientation corresponding to the azimuth and elevation data set into the computer mechanism.

Also actuated from receiver 4 is a range indicator 6″. A matching index is provided for indicator 6″ as described in more detail in copending application Serial No. 15,398 for Radio Range Indicating System, filed March 17, 1948, in the names of J. E. Shepherd and G. E. White, which is placed under the control of range pedal 10 serving also to set range data into computer 7.

In operating the system of Fig. 2, the operator will, by his manual control 8, orient scanner 1 until the tracking indicator 6′ shows that the target orientation coincides with the scanner orientation. At the same time, the operator actuates the range foot pedal 10 to match the range index to the indication produced by range indicator 6″. When these conditions obtain, and are maintained even during the motion of the target, the operator will know that the proper data is set into computer 7 and that the guns 9 controlled from the computed output of computer 7 are directed at the correct aiming angles to intercept the target with a projectile, and he may therefore, by a suitable firing key or control, fire at the target.

This system is known as "manual tracking" since the operator, through his manual control 8 and foot pedal 10, directly actuates the scanner and computer 7 to track with the target as evidenced by indicators 6′ and 6″. The scanner 1, in effect, operates to produce a radio line of sight in the same way as the sighting telescope in a conventional anti-aircraft or interaircraft system operates to produce an optical line of sight, to enable the computer 7 to track with the present position of the target, whereby the proper gun aiming angles are determined.

Figure 3:
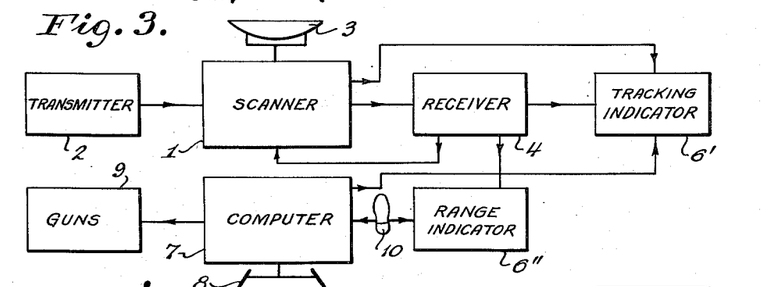
Fig. 3 shows a corresponding block diagram of the system during manual automatic operations.

A second type of tracking operation is illustrated in Fig. 3 and is termed "semi-automatic tracking." In this case the scanner 1, again performing circular conical scanning as described with respect to Fig. 2, is caused to automatically align its orientation with that of the target. This is done by using the reflected pulses received from the target to actuate suitable servomotors for orienting the scanner, which is thereby automatically oriented toward and tracks with the target. The computer 7 is again manually controlled from controls 8, in this instance to follow and track with the orientation of scanner 1. Thus, tracking indicator 6′ in this type of system serves to indicate the displacement between the orientations of scanner 1 and computer 7, and computer 7 is actuated to maintain this "computer error" at zero. When this condition obtains, and with the proper computer range adjustment, similar to that described in Fig. 2, the output of computer 7, controlling guns 9, again represents the proper gun aiming angles and effective fire may be obtained from the guns.

Figure 4:
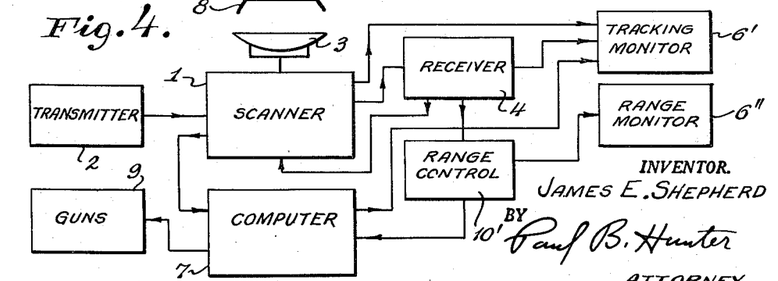
Fig. 4 shows a block diagram of the system during full automatic operations.

Fig. 4 shows the third or "full automatic" tracking system in which no manual actuation is necessary. Here, scanner 1 is automatically oriented toward the target, under the control of the output of receiver 4, as in Fig. 3, and, in addition, the "orientation" of computer 7 is caused to automatically follow the position of scanner 1 by a suitable servo mechanism. In this manner, the proper target azimuth and elevation data are set into the computer 7. The range adjustment of computer 7 is also automatically performed by a range control 10′ under the control of receiver 4. This system, however, does not obtain the target rates, that is, elevation rate and azimuth rate, in the same manner as in Figs. 2 and 3.

In the system of Fig. 4, it is necessary to determine elevation rate and azimuth rate by actually measuring the angular rate of motion of the azimuth and elevation input controls of scanner 1. This may be done in any well known way, such as is shown and described in U. S. Patent No. 2,206,875, for Fire Control Device issued July 9, 1940, in the name of E. W. Chafee et al. In this manner, all the required data may be set into computer 7 and therefore the guns 9 are automatically oriented at the proper gun aiming angles and automatically follow the target with, of course, the computed lead angles.

Indicator 6′ in this instance merely serves as a monitor indicator to show how well the scanner 1 is following the target or, alternatively, how well the computer 7 is following and tracking with scanner 1. Indicator 6″ serves similarly as a range monitor indicator.

The system is therefore capable of four alternative modes of operation, namely, searching, manual tracking, semiautomatic tracking, and full automatic tracking.

Fig. 5 shows a schematic representation of one suitable type of scanner 1. Thus, the scanner 1 may comprise a directive antenna system 3, shown as comprising a parabolic wave guide reflector, and energized through suitable electromagnetic wave guide connections 11 from transmitter 2. A suitable construction for scanner 1 is shown and described in copending application Serial No. 438,388, for Scanning Devices, filed April 10, 1942, in the names of L. A. Maybarduk, W. W. Mieher, S. J. Zand and G. E. White, now Patent No. 2,410,831. As therein disclosed, the antenna arrangement 3 in one form may be continuously "nodded" or oscillated at a slow rate about nod axis 12 which is itself rapidly and continuously rotated or "spun" about spin axis 13 thereby producing a spiral conical scanning pattern by the continuous widening of the conical sweeping about spin axis 13. To convert from the spiral searching scanning to the circular tracking scanning, the nod motion about the nod axis 12 is interrupted with the orientation of the directive radiation or receptivity pattern axis 21 displaced slightly from the spin axis 13.

In order to feed radiant energy from wave guide 11 to the radiator 3, suitable stationary joints 14 and rotating joints 16 are provided as described more in detail in the above-mentioned copending application Serial No. 438,388, now Patent 2,410,831, and in copending application Serial No. 447,524 for High Frequency Apparatus, filed June 18, 1942, in the names of W. W. Mieher and J. Mallet, now Patent No. 2,407,318.

To provide the necessary control of tracking indicator 6' from scanner 1, in the manner to be described, suitable self-synchronous position transmitters are provided for producing signals indicative of the instantaneous position of the radiator 3 in nod and in spin, that is, indicative of the orientation of axis 21. The nod transmitter is indicated schematically at 17, the spin transmitter at 18. These transmitters may be of the well known "Selsyn," "Autosyn," or "Telegon" types.

Referring to Fig. 6, there is shown the radiation or receptivity pattern 19, of the antenna array 3 of Fig. 5. It will be noted that this radiation pattern 19 preferably is axially symmetrical about axis 21, and is substantially contained within a narrow solid cone 22, thereby forming a sharply directive beam of transmitted energy or a sharply directive reception pattern. Pattern 19 has been exaggerated for purposes of illustration, and preferably is very narrow, such as about 4° between the half-power points. During searching operations the axis 21 of this beam 19, by virtue of the combined effect of the nodding and spinning action of scanner 1, is caused to sweep out a spiral cone in space, the solid angle of this sweep being suitably chosen and ranging up to a complete hemisphere as desired. Preferably, the angular pitch of this spiral is chosen to be of the order of the effective angular width of the beam 19 whereby, during one complete spiral scan every portion of the conical solid angle will have had radiant energy projected to it, and radiant energy may be received from every such portion. The rates of nod and spin of the scanner of Fig. 5 are suitably chosen to provide a sufficiently short time interval for a complete scan, suitable for the purposes at hand.

During tracking operations the nod motion of scanner 1 is stopped at a position so that the axis 21 of maximum radiation or receptivity is displaced slightly from the spin axis 13 about which the radiation pattern 19 is rotated. In this way, as shown in Figs. 7 and 7A, energy of constant intensity is radiated or received along an axis 23 coincident with spin axis 13. However, along some other axis, such as 24, for example, maximum radiation and maximum receptivity are encountered only once during each spin cycle, resulting in a spin frequency modulation of waves received by reflection from an object oriented along axis 24.

The use of the same antenna arrangement for transmitting and receiving increases the sharpness of the resulting determinations since the over-all response pattern is the product of the radiation and receptivity patterns. If desired, however, a non-directional transmitter or receiver could be used with the described scanner acting respectively as a receiver or transmitter.

Conversion from searching to tracking scanning is effected, as described in application Serial No. 438,388, now Patent 2,410,831, merely by energization of a suitable control solenoid. Other types of scanners are also described therein, requiring different apparatus for converting from searching to tracking, but all adapted to be used for searching or tracking in the same manner as the scanner of Fig. 5.

It may also be desirable to adjust the axis of this spiral scanning during the searching operation. For this purpose, scanner 1 may be provided with an elevation axis 26 and an azimuth axis 27 about which it may be suitably adjusted, in the manner described in application Serial No. 438,388, now Patent 2,410,831, the control action being as described below. Also, suitable elevation and azimuth position transmitters 28 and 29 may be used, as will also be described below.

Fig. 8 shows one form of radio and indicator system for giving suitable indications during searching. Thus, assuming that the scanner of Fig. 5 is performing the spiral scanning described above, antenna array 3 is fed with radiant energy as over wave guide 11, from a transmitter and modulator unit 31. This transmitter 31 is adapted to produce high frequency radiant energy in any well known manner, and to modulate this high frequency energy by means of periodically recurring short duration pulses such as may be derived from a conventional control oscillator and pulse generator 32. There is thus radiated from the radiating arrangement 3 a sequence of short pulses of high frequency radiant energy. The frequency of control oscillator 32 and thereby the repetition frequency of the radiated pulses is chosen to have a suitably high value such that a substantial number of pulses is sent out during each spin rotation of the scanner 1 of Fig. 5. Suitable values for various constants of the circuits during this form of operation have been found to be the following: spin rotation, 1200 revolutions per minute; nod oscillation, 30 complete oscillations per minute; pulse repetition frequency, 2000 per second. With these values it will be seen that one complete cycle of spiral scanning will be accomplished each two seconds, one second being taken up in a spiral scan from zero nod to full nod, the other second of the cycle comprising the time for spiral scanning from full nod back to zero nod. During each half of the complete cycle 20 complete spin rotations are performed. Thus, for a full hemisphere of scan, the angular advance for each spin cycle will be approximately 4½ degrees, which is of the order of magnitude of the width of the radiation pattern 19 shown in Fig. 6. The pulse repetition rate of 2000 pulses per second gives 100 pulses per spin rotation, which thereby produces one pulse for each 3.6 degrees of motion of the radiation pattern 19 during scanning. Since the radiation pattern 19 is approximately 4 to 5 degrees wide, it will be seen that at least one pulse of radiant energy is transmitted to each point of the hemisphere.

Should a distant object be in the field of the system during radiation, at least one pulse will be incident thereon, and reflected therefrom. This reflected pulse or pulses will be picked up in the antenna arrangement 3 and conducted through wave guide 11 to the receiver unit 4 through a T-R box 33. T-R box 33 is adapted to pass the relatively low intensity received pulses but to block out the relatively high intensity transmitted pulses derived from transmitter 31. A suitable form for such a T-R box 33 is shown in copending application Serial No. 406,494 for Radio Apparatus for the Detection and Location of Objects, filed August 12, 1941, in the names of J. Lyman et al., and comprises, as is therein shown, an ionizable medium containing a spark gap within a resonant cavity which is resonant to the high frequency of transmission. The spark gap is so adjusted that the low intensity received waves are insufficient to create a discharge across the gap, whereas the high intensity transmitted pulses are sufficient to create such a discharge, which thereby ionizes the ionizable medium and effectively short circuits the wave guide 11 to these transmitted waves. In this manner the receiver unit 4 is effectively isolated from the high intensity transmitted pulses while being free to receive the pulses reflectd from a distant object. Receiver unit 4 includes conventional pre-amplifying, detecting and wideband amplifying units, all well known in the art, and is adapted to produce, in its output, signal currents or voltages corresponding to the wave shape of the envelope of the received reflected wave.

The received pulses are applied to the control grid 37 of the cathode ray tube indicator 6 shown in Fig. 8. Grid 37 is provided with a suitable bias, as by way of lead 38, such that, with no output from receiver 4, the cathode ray beam, produced by the usual means, is prevented from reaching the screen of the cathode ray tube indicator 6. However, this bias is also so adjusted that the received pulses 36 derived from the receiver unit 4 are permitted to momentarily render the electron beam trace visible on the screen of indicator 6. Thus, it will be clear that each time a reflected pulse is received a momentary bright spot occurs on the cathode ray screen.

In order to give an indication of the orientation of the reflected object with respect to the location of the system of the invention it is desirable to produce a spiral scanning of the electron beam in synchronism with and correspondingly instantaneously to the spiral scanning of the radiation and reception pattern 19. Suitable devices for obtaining deflecting voltages which will produce such a spiral scanning are shown in Figs. 9 through 12. Assuming, for the moment, that such spiral sweep voltages, designated as $P_1$ and $P_2$, have been obtained, these voltages $P_1$ and $P_2$, to be hereafter described more in detail, are impressed upon respective pairs of deflecting plates of the cathode ray indicator 6 and produce a spiral scanning of the electron beam such that at each instant the orientation of the latent trace of the beam on the screen of the cathode ray indicator 6 with respect to the screen center or pole 39 of Fig. 8A, corresponds to the instantaneous orientation of the beam axis 21 of antenna array 3 of scanner 1. Under these conditions the momentary brightening or intensifying of the electron beam under the control of receiver 4 will produce a momentary bright spot such as 41 shown in Fig. 8A. If a plurality of objects having different orientations are within the effective field of the searching system further bright spots such as 42 and 43 will also be produced, each having an orientation with respect to pole 39 respectively corresponding to the orientation of the corresponding reflecting object with respect to the spin axis 13 of the scanner 1.

As described above, the transmitted pulses and hence the reflected pulses are of quite short duration, such as the order of 1 microsecond. In order that the bright spots 41, 42 and 43 may be more clearly shown it is desirable to let the beam impinge upon the screen for a longer interval. For this purpose a signal storer 44 is inserted between receiver 4 and intensity control grid 37. This signal storer 44 may simply comprise a condenser-resistor network adapted to be instantaneously charged by a pulse derived from receiver 4 and which will maintain its charge beyond the duration of the pulse. However, the time constant of the signal storer 44 is preferably so chosen that this accumulated charge will be fully dissipated within a time not much longer than one recurrence period of the transmitted pulses in order that erroneous indications shall not be obtained. In this way the traces 41, 42, 43 are made brighter. In addition, the screen of indicator 6 is preferably made of high retentivity, so as to maintain its indication for a substantial interval after excitation is removed.

Figures 9, 10A, 10C:
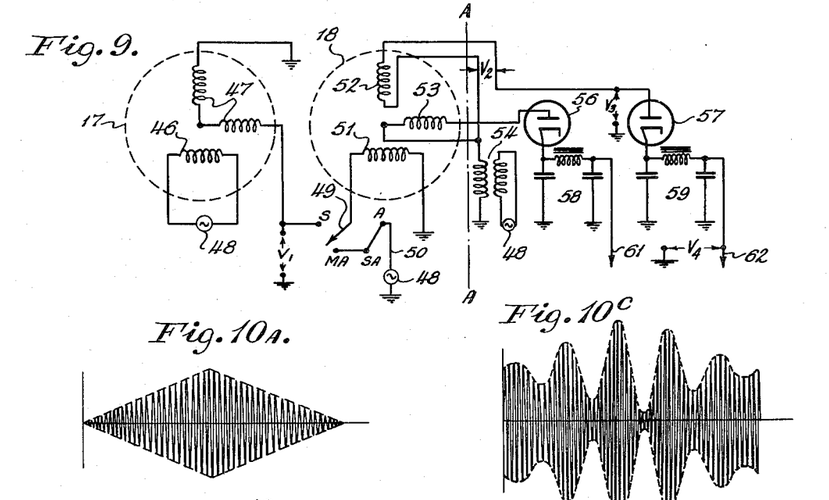
Fig. 9 shows a schematic circuit diagram of the spiral sweep or reference voltage generating apparatus for the circuit of Fig. 8.
Figs. 10A, 10B, 10C, and 10D are voltage-time graphs useful in explaining the operation of the circuit of Fig. 9.

Fig. 9 shows one form of circuit for producing the spiral sweep voltages used with indicator 6 of Fig. 8. In this figure, nod transmitter 17 is indicated as being of a two-phase type having a single-phase energizing winding 46 and a two-phase secondary winding 47, in this instance connected in series to provide a single output. Winding 46 is energized from a suitable source 48 of alternating current. The output voltage appearing across the polyphase winding 47, namely voltage $V_1$ having wave shape as shown in Fig. 10A, will therefore be an alternating voltage having the frequency of source 48 and an amplitude varying in correspondence with the amount of nod, referred to the orientation of the scanner spin axis as zero nod. This wave is shown in Fig. 10A, being illustrated as having a linear change of amplitude with nod. It is to be noted that ordinarily this change of amplitude will be sinusoidal in character. However, by the use of proper motion converting devices whereby full nod motion corresponds to a small angular displacement of winding 46 with repect to winding 47, it may be made linear as illustrated. Preferably full nod is made to correspond to less than 45° rotation of transmitter 17, resulting thereby in substantially linear output as shown in Fig. 10A.

Figure 10B:
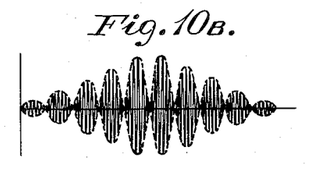
Figure 10D:
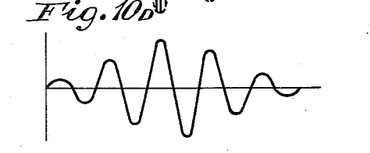

During searching operations, switch 49 will be connected to terminal 8 and hence the output voltage $V_1$ of nod transmitter 17 is fed to the single-phase winding 51 of the spin transmitter 18. The output from each of the two-phase windings 52 and 53 of spin transmitter 18 will then be the wave of Fig. 10A sinusoidally modulated in amplitude at the frequency of spin. This is shown in Fig. 10B for the winding 52. The winding 53, being displaced 90° in space with respect to winding 52, will have induced in it a voltage of similar wave shape but displaced 90° in phase at the spin frequency. In effect, spin transmitter 18 serves as a two-phase generator of spin frequency whose output amplitude is controlled by nod transmitter 17.

To each of these voltage outputs from windings 52 and 53 there is added a voltage of the frequency of source 48, as by way of transformer 54, producing the wave shown in Fig. 10C. It is to be noted that the wave of Fig. 10B represents in effect a suppressed-carrier modulated wave. The reinsertion of the carrier as by transformer 54 produces the usual modulated carrier wave shown in Fig. 10C. The resulting two waves are then rectified or detected in respective rectifiers 56 and 57 and filtered in filters 58 and 59 to produce the output voltages appearing on output leads 61 and 62 having the wave shape shown in Fig. 10D, namely, phase-displaced voltages of spin frequency modulated by the nod wave envelope.

These two voltage appearing on lines 61 and 62 will be phase displaced by 90° of the spin frequency. They will be termed the spiral sweep voltages $P_1$ and $P_2$, respectively. As is well known, if two voltages of equal amplitude and frequency, phase displaced by 90°, are impressed on the respective pairs of deflecting plates of a cathode ray tube, the resulting trace of the electron beam will be circular. By simultaneously varying the amplitudes of the two voltages the diameter of the circle will be varied.

In the present instance, by using the two waves $P_1$ and $P_2$ as the deflecting voltages, the beam will be caused to produce a circular pattern of constantly changing diameter and will thereby produce a spiral pattern similar to the pattern swept out in space by the scanner 1. It will, therefore, be clear that these voltages $P_1$ and $P_2$ are particularly suited for use in indicator 6.

During any of the three types of tracking, nod transmitter 17 is disconnected from spin transmitter 18 by switch 49, which then connects winding 51 of spin transmitter 18 to a fixed source of alternating voltage, such as source 48, as by way of lead 50. In this case, output sweep voltages $P_1$ and $P_2$ will have constant amplitude, producing a circular trace on indicator 6, and accordingly will be termed "circular sweep voltages."

Figure 11:
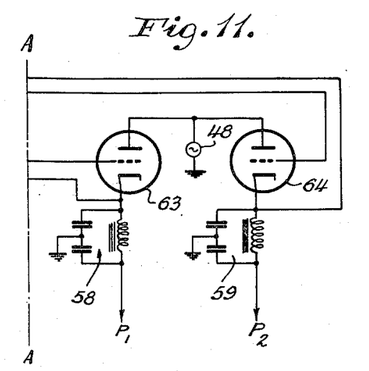
Fig. 11 shows a modification of a portion of the circuit of Fig. 9 to the right of line A—A thereof.

Fig. 11 shows an alternative circuit for inserting the carrier and demodulating the waves produced by spin transmitter 18 to produce the sweep voltages P₁ and P₂. Thus, here the respective outputs of windings 52 and 53 are impressed upon the grids of respective detector or demodulator tubes 63 and 64 whose plate circuits are energized simultaneously from alternating voltage source 48. By properly phasing the anode voltage with respect to the grid voltages, and by filtering out all carrier frequency components, as in filters 58 and 59, the same type of spiral sweep voltages P₁ and P₂ will be obtained as in Fig. 9.

Figure 12:
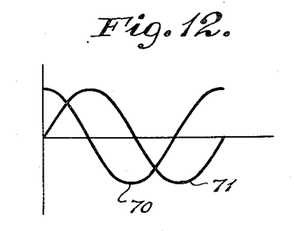
Fig. 12 illustrates the phase relation of the circular deflection voltages derivable from the apparatus of Figs. 9 and 11.

Fig. 12 represents the sweep voltage P₁ and P₂ which are derived from the foregoing voltage generating apparatus when no modulation corresponding to the nod motion of the antenna or transmitter is effected. These voltages indicated as 70 and 71, respectively, have substantially equal maximum amplitudes and are of a frequency corresponding to the spin frequency of the antenna, being phase displaced by 90°. These voltages are therefore useful under tracking conditions, when conical scan is effected, as azimuth and elevation reference voltages in determining those error components of the angle of errors between the directivity axis of the scanner and the direction toward the chosen target. The spiral sweep voltages P₁ and P₂ will have the appearance of that shown in Fig. 10D but phase displaced as in Fig. 12.

During manual tracking, in which the scanner 1 and computer 7 are manually actuated together, it is necessary to provide some type of indication whereby the gunner may know when he is accurately tracking with the target; that is, when scanner 1 is oriented toward the target, and the correct target orientation data is being set into computer 7.

Figures 13, 13A, 14, 14A, 15, 16, 16A:
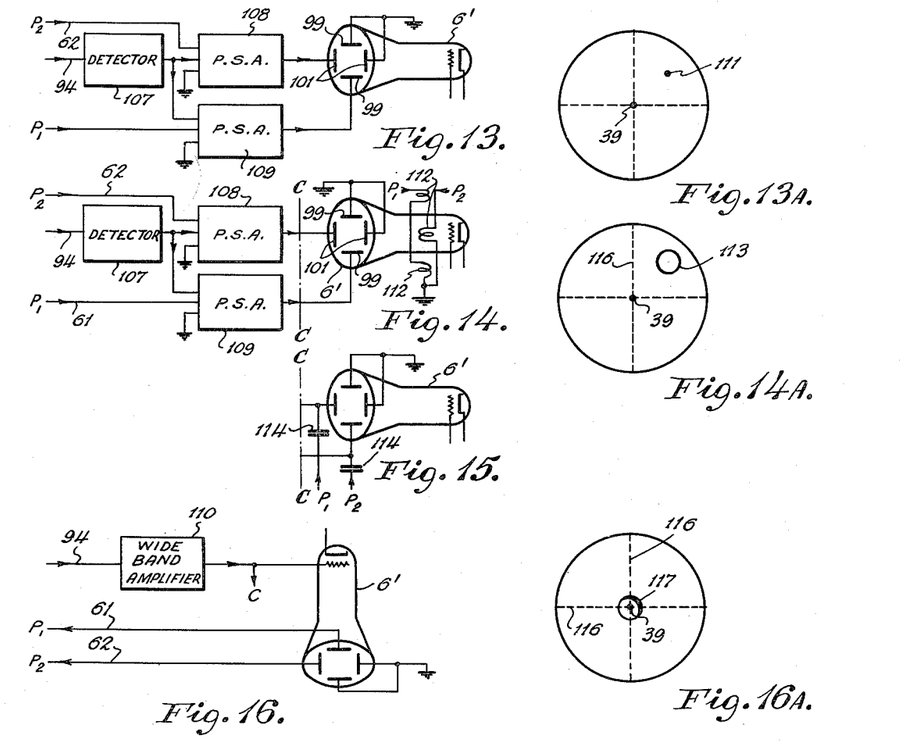
Fig. 13 shows a block circuit diagram of one form of indicator useful during tracking operations.
Fig. 13A shows a representative indication produced by the circuit of Fig. 13.
Fig. 14 shows a modification of the indicating system of Fig. 13.
Fig. 14A shows a representative indication produced by the circuit of Fig. 14.
Fig. 15 shows a modification of the portion of the circuit of Fig. 14 to the right of line C—C thereof.
Fig. 16 shows another modification of the circuits of Figs. 13, 14, and 15.
Fig. 16A shows a representative indication produced by the circuit of Fig. 16.

Fig. 13 shows one type of such tracking indicator circuit. As described above, during all tracking operations, including manual, semi-automatic and full-automatic tracking, the transmitted beam is rotating about a very narrow cone, as illustrated in Figs. 7 and 7A. If the target is situated exactly along the axis of symmetry 13 (or 23) of this cone, all reflected pulses will be received with constant and equal intensity. This indicates proper tracking with the target. Should the target, however, deviate from this desired condition, as when its orientation is along axis 24 of Fig. 7, the reflected pulses will periodically vary in amplitude at a frequency equal to the spin frequency of the scanning. In effect, this produces a spin frequency modulation upon the received pulses.

Furthermore, it will be clear that the instantaneous maximum of this spin frequency modulation will occur at the instant the axis 21 of the beam is projected closest to line 24. Hence the phase of this modulation bears a relation to the spinning of the scanner which is indicative of the orientation of the reflecting object. Accordingly, the orientation of the object with respect to spin axis 13 (or 23) may be determined by comparing the phase of the modulation with the spin cycle of the scanner or, which is the same, with the sweep voltages P₁ and P₂, which will be of fixed amplitude upon operation of the switch to cut out unit 17 and have fixed phase relation to the scanner motion.

Thus, referring to Fig. 13, the receiver output 94, now comprising the received pulses periodically varying in amplitude at the spin frequency, is applied to a further detector, such as 107, including a filter adapted to pass waves only of the spin frequency, whose intensity will therefore give a measure of the amount of deviation of the target from the desired orientation with respect to the tracking system, (within a predetermined region) and whose phase with respect to voltages P₁ and P₂ indicates the relative orientation of the target with respect to the scanner orientation. Preferably, detector 107 also acts to fill in the wave envelope between pulses, whereby a substantially sinusoidal output in phase with the pulse modulation is obtained.

Such phase comparisons are performed in the respective azimuth and elevation phase sensitive amplifiers 108 and 109 in Fig. 13. These amplifiers are of any conventional type adapted to produce in their outputs a undirectional voltage corresponding in polarity and magnitude to the sense and magnitude of the component of the output of detector 107 co-phasal or anti-phasal with the reference voltage P₁ or P₂.

The respective outputs of amplifiers 108 and 109 are connected to the respective deflecting plates 99, 101 of indicator 6' and will thereby produce on its screen a bright dot, such as 111, shown in Fig. 13A, whose position relative to the pole 39 of the screen is the same as the position of the reflecting object relative to the axis of the conical scanning performed by the scanner 1 and hence indicates the displacement or "error" between scanner and target. It will be clear that the fire control officer, to perform accurate tracking, must control the settings of the computer in such a manner that spot 111 is maintained at the pole 39, in which case the scanner is oriented toward the target and the proper azimuth and elevation data corresponding to present target position are introduced into computer 7. If, at the same time, the range control 10 of the computer 7 is adjusted, the complete data required by computer 7 is thus set into it, and the output of computer 7 may serve to correctly orient the guns or turrets 9 to effectively engage the target.

Fig. 14 shows a modification of the circuit of Fig. 13 adapted to produce as its indication a small circle which is displaced from the pole 39 in the same manner as spot 111. In this modification, the deflecting plates 99, 101 of indicator 6' are actuated in the same manner described with respect to Fig. 13. In addition, however, indicator 6' is provided with the usual deflecting coils, such as coils 112, the respective pairs of these coils being energized from the respective circular sweep voltages P₁ and P₂. The effect of these deflecting coils 112 is to produce a circular motion of the cathode ray trace. The effect of the deflecting plates 99, 101 is to displace the center of this circle in accordance with the scanner error, yielding the indication shown in Fig. 14A, comprising movable circle 113.

Fig. 15 shows a modification of that portion of Fig. 14 to the right of line C—C. This modification is adapted produce the same type of indication shown in Fig. 14A. In this instance, no extra deflecting coils 112 are necessary, but the sweep voltages P₁ and P₂ are coupled directly to the deflecting plates of the indicator 6' to be superimposed upon the output waves of the respective phase sensitive amplifiers 108 and 109. Preferably, sweep voltages P₁ and P₂ are coupled to the deflecting plates by way of coupling and blocking condensers 114, which serve to isolate the two inputs to each pair of deflecting plates from one another.

It will be clear that here also the gunner must operate the scanner so as to cause the circular indication 113 to be maintained symmetrical with respect to pole 39 or to suitable cross hairs such as 116.

Fig. 16 shows a further modification of the tracking indicators of Figs. 13 to 15. Here the electron beam of cathode ray indicator 6' is caused to trace a fixed circle, such as 117, on the screen of indicator 6'. The output 94 of receiver 4 is connected to a wide-band amplifier 110 of any well known type adapted to reproduce the output wave of receiver 4 in amplified form. The output of amplifier 110 is connected to the intensity control grid 37 of indicator 6. When the scanner 1 is correctly oriented with respect to the target; that is, when the target orientation is coincident with the scanner spin axis 13, each of the reflected pulses will be of equal amplitude. Accordingly, each of the spot traces produced on the indicator screen at the instant that the reflected pulse is received will be of equal intensity. Should the target orientation differ from the scanner orientation, certain of these received pulses will be of greater amplitude, resulting in the correspondingly greater intensity of their corresponding spot traces. Under such conditions, one portion of the circular trace 117 will have greater brightness than the diametrically opposite portion. In effect, an arcuate section of circle 117 will have maximum brightness, whereas the diametrically opposite arc will have minimum brightness. The angular position of this bright arc with respect to cross hairs 116 will correspond directly to the angular position of the target with respect to the scanner. Accordingly, the operator then must actuate the scanner so as to produce equal intensity for all parts of the circle 116, in order to effect proper tracking.

The actual indication of Fig. 16A, instead of being a true circle, is really a circular arrangement of dots. In the illustrative circuit values indicated above, there would be 100 of these dots in each complete circle. If it is so desired, a signal storer, such as described with respect to Fig. 8, may be inserted to enhance the brightness of these spots. A further signal storer, having longer time constant, may be used to "run over" between spots and provide a true circular indication having increased brightness for parts thereof corresponding to the target orientation.

Figure 17:
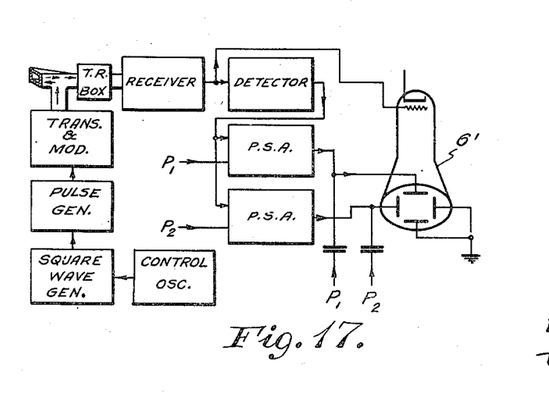
Fig. 17 shows a block circuit diagram of a further indicating system useful during tracking and incorporating several of the features of Figs. 13 to 16.
Figure 17A:
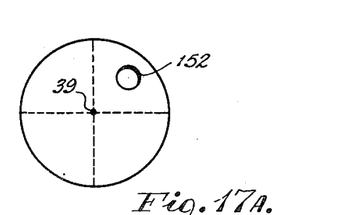
Fig. 17A shows a representative indication produced by the circuit of Fig. 17.

Fig. 17 shows a complete radio and indicator circuit combining several of the features of Figs. 13 to 16. From what has been described above, it should be clear that the indication in this instance, as shown in Fig. 17A, will be a circular trace 152 whose position with respect to pole 39 represents the scanner error, this circular trace 152 being modulated in intensity in the manner described with respect to Fig. 16.

In the foregoing, I have indicated that the cathode ray tube provides an indication of scanner error. As set forth in parent application Serial No. 441,188 now Patent 2,617,982, the indication provided by the tube may be of the error or relative displacement between the computer and the scanner. Hence, it is to be understood that the indicating system of the present invention may be employed to indicate the direction of any measurable error, along one or two coordinates, and errors involving various parameters and also the magnitudes of such errors and, in its broader sense, is not limited to the indication of any particular error such as herein shown and described mainly for exemplary purposes.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A tracking indicating system comprising means for transmitting electromagnetic energy, means for receiving that portion of said energy reflected from an object, one of said means having a highly directional characteristic, means for causing rotation of said directional characteristic about a predetermined axis, means for generating substantially constant amplitude alternating voltages in phase quadrature and of the same frequency as the period of rotation of said directional characteristic, a cathode ray tube, means energized by said voltages for causing the beam of said tube to rotate at a constant radius and in timed relation to the rotation of said directional characteristic to thereby produce a circumferential trace forming a circle on the screen of said tube, and means responsive to the amplitude of the modulation envelope of received energy for controlling the intensity of said circular trace to indicate the relative displacement of said object and said axis.

2. An error-indicating system comprising a rotatable energy-responsive means and means for producing a periodically varying signal voltage having a frequency dependent upon the rate of rotation of said rotatable means and having a time phase dependent upon and varying with the angular position of an object about a reference point, means for rotating said energy-responsive means, a cathode ray tube, means for causing the beam of the tube to describe a predetermined path in timed relation to the rotation of said energy-responsive means, and means for modulating the intensity of said beam in accordance with said signal voltage.

3. An error-indicating system comprising an energy-receiving means having a directional axis and means for rotating the directional axis of said means about a predetermined axis in a generally conical manner, a receiver connected with said energy-receiving means for producing a periodically varying signal voltage having a time phase dependent upon and varying with the angular position of an object relative to said predetermined axis, a cathode ray tube, means for causing the beam of said tube to describe a predetermined geometric figure on the screen of said tube, and means for modulating the intensity of said beam in accordance with said signal voltage.

4. An error-indicating system comprising scanner means rotatable about a reference axis for providing a signal voltage cyclically variable with rotation of said scanner about said axis and having a time phase dependent upon and varying with the position of an object relative to said axis, means for rotating said scanner means, a cathode ray tube, means for causing the beam of the tube to produce a circular trace on the screen of the tube in synchronism with the rotation of said scanner means, and means for modulating the intensity of said beam in accordance with said signal voltage.

5. An error-indicating system comprising means for producing a periodically varying signal voltage having a time phase dependent upon and varying with the angular position of an object about a reference point, a cathode ray tube, means for causing the beam of the tube to describe a predetermined path in cyclic synchronism with the signal voltage, means for modulating the intensity of said beam in accordance with said signal voltage, and means for deflecting the beam of said tube in accordance with said signal voltage.

6. An error-indicating system comprising scanner means rotatable about a reference axis for providing a signal voltage cyclically variable with rotation of said scanner about said axis and having a time phase dependent upon and varying with the position of an object relative to said axis, means for rotating said scanner means, a cathode ray tube, means for causing the beam of the tube to produce a circular trace on the screen of the tube in timed relation to the rotation of said scanner means, means for modulating the intensity of said beam in accordance with said signal voltage, and means for deflecting the center of the circular trace from the electrical center of said tube in accordance with said signal voltage.

7. A tracking indicating system comprising means for transmitting electromagnetic energy, means for receiving that portion of said energy reflected from an object, one of said means having a highly directional characteristic, means for causing rotation of said directional characteristic in a generally conical manner about and at a small angle to a predetermined axis, a cathode ray tube, means for causing the beam of said tube to describe a predetermined closed geometric figure in timed relation with the rotation of said directional characteristic, and means for modulating the intensity of the beam of said tube in accordance with the amplitude of the modulation envelope of the received electromagnetic energy.

8. A tracking indicating system comprising means for transmitting electromagnetic energy, means for receiving that portion of said energy reflected from an object, one of said means having a highly directional characteristic, means for causing rotation of said directional characteristic about and at a small angle to a predetermined axis, a cathode ray tube, means for generating a beam-deflecting voltage of the same frequency as the rotation of said directional characteristic, means controlled by said beam-deflecting voltage for causing the beam of said tube to describe a circular path in synchronism with the rotation of said directional characteristic, and means for modulating the intensity of the beam of said tube in accordance with the amplitude of the modulation envelope of the received electromagnetic energy.

9. A tracking indicating system comprising means for transmitting electromagnetic energy, means for receiving that portion of said energy reflected from an object, one of said means having a highly directional characteristic, means for causing rotation of said directional characteristic in a cyclic manner about a predetermined axis, a cathode ray tube, means for generating a pair of beam-deflecting voltages in quadrature phase relation and of the same frequency as the rotation of said directional characteristic, means controlled by said quadrature voltages for causing the beam of said tube to describe a circular path on the screen of the tube, and means for modulating the intensity of the beam of said tube in accordance with the amplitude of the modulation envelope of the received electromagnetic energy.

10. A tracking indicating system comprising means for transmitting electromagnetic energy, means for receiving that portion of said energy reflected from an object, one of said means having a highly directional characteristic, means for causing rotation of said directional characteristic about a predetermined axis, a cathode ray tube, means for causing the beam of said tube to describe a predetermined closed geometric figure, means for modulating the intensity of the beam of said tube in accordance with the amplitude of the modulation envelope of the received electromagnetic energy, means for obtaining two voltage components proportional respectively to the values of the amplitude of the modulation envelope of the received energy at fixed points spaced substantially 90° apart in the rotation of the directional characteristic whereby to obtain measures along perpendicular coordinates of the direction of said object relative to the axis of rotation of said directional characteristic, and means for deflecting the beam of said tube by said voltage components along corresponding coordinates of the tube screen.

11. A tracking indicating system comprising means for transmitting electromagnetic energy, means for receiving that portion of said energy reflected from an object, one of said means having a highly directional characteristic, means for causing rotation of said directional characteristic about a predetermined axis, a cathode ray tube, means for generating a pair of beam-deflecting voltages in quadrature phase relation and of the same frequency as the rotation of said directional characteristic, means controlled by said quadrature voltages for causing the beam of said tube to describe a circle on the screen of the tube, means for modulating the intensity of the beam of said tube in accordance with the amplitude of the modulation envelope of the received electromagnetic energy, means for obtaining voltage components proportional respectively to the values of the amplitude of the modulation envelope of the received energy at fixed points spaced substantially 90° apart in the rotation of the directional characteristic whereby to obtain measures along perpendicular coordinates of the direction of said object relative to the axis of rotation of said directional characteristic, and means for deflecting the beam of said tube by said voltage components along corresponding coordinates of the tube screen.

12. A tracking indicating system comprising means for transmitting electromagnetic energy, means for receiving that portion of said energy reflected from an object, one of said means having a highly directional characteristic, means for causing rotation of said directional characteristic about a predetermined axis, a cathode ray tube, means for causing the beam of said tube to describe a circular trace on the screen thereof in synchronism with the rotation of said directional characteristic, and means for modulating the intensity of the beam in accordance with the amplitude of the modulation envelope of received energy.

13. A tracking indicating system comprising means for transmitting electromagnetic energy, means for receiving that portion of said energy reflected from an object, one of said means having a highly directional characteristic, means for causing rotation of said directional characteristic about a predetermined axis, a cathode ray tube, means for causing the beam of said tube to describe a circular trace on the screen thereof in synchronism with the rotation of said directional characteristic, means for modulating the intensity of the beam in accordance with the amplitude of the modulation envelope of received energy, and means for deflecting the center of said circular trace relative to the center of said tube in a direction corresponding to the direction of said object relative to the axis of rotation of said directional characteristic.

14. Apparatus for indicating the magnitude and sense of the relative displacement of two axes comprising means for producing signal voltages proportional to two components of said displacement measured along relatively angularly disposed coordinates, a cathode ray tube, means for producing a trace of the cathode ray beam in the form of a circle on the face of said tube, and means responsive to said signal voltages for displacing the center of said circular trace along two coordinates of the tube face corresponding to those of the signal voltage measures.

15. Apparatus for indicating the direction of relative displacement of two axes comprising a cathode ray tube, means for producing a trace of the electron beam in the form of a circle on the face of said tube, means for detecting the direction of relative displacement of said two axes, means responsive to said detecting means for modulating the intensity of said circular trace to produce varying degrees of brightness along the circumference thereof whereby the arcuate portion of said trace having an intensity differing from the balance of said circular trace will represent with respect to the center of said circle the direction of the relative displacement of the two axes.

16. Apparatus for indicating the magnitude and sense of the relative displacement of two axes comprising means for producing signal voltages proportional to two components of said displacement measured along relatively angularly disposed coordinates, a cathode ray tube, means for producing a circular trace of the electron beam of said tube, means responsive to said signal voltages for displacing the center of said circular trace along two coordinates of the tube face corresponding to those of the signal voltage measures, and means for modulating the intensity of said circular trace to indicate said relative displacement.

References Cited in the file of this patent

UNITED STATES PATENTS

| | | |
|---|---|---|
| 2,400,791 | Tolson et al. | May 21, 1946 |
| 2,407,281 | Johnson | Sept. 10, 1946 |
| 2,408,414 | Donaldson | Oct. 1, 1946 |
| 2,409,448 | Rost | Oct. 15, 1946 |
| 2,449,976 | Busignies | Sept. 28, 1948 |
| 2,450,341 | Hershberger | Sept. 28, 1948 |
| 2,471,516 | Bryant | May 31, 1949 |

FOREIGN PATENTS

| | | |
|---|---|---|
| 108,556 | Australia | Sept. 14, 1939 |
| 864,375 | France | Apr. 25, 1941 |
| 116,667 | Australia | Oct. 10, 1941 |